United States Patent [19]

Belsky et al.

[11] 4,222,989

[45] Sep. 16, 1980

[54] METHOD FOR THE MANUFACTURE OF PURE ALUMINUM OXIDE FROM ALUMINUM ORE

[76] Inventors: Milan Belsky, Lennestrasse 47, D-5300 Bonn; Albert Schwind, Elbestrasse 17, D-5303 Bornheim-Hersel; Günter Winkhaus, Auf dem Stappenberg 2b, D-5330 Konigswinter 1; Joseph Schierholt, Franz-Marc-Str. 10, D-4130 Moers 2, Kapellen, all of Fed. Rep. of Germany

[21] Appl. No.: 6,910

[22] Filed: Jan. 26, 1979

[30] Foreign Application Priority Data

Jan. 27, 1978 [DE] Fed. Rep. of Germany ....... 2803483

[51] Int. Cl.² ............................................. C01F 7/20
[52] U.S. Cl. ..................................... 423/126; 423/34; 423/42; 423/132; 423/158; 423/122
[58] Field of Search ........................ 423/126, 132, 122

[56] References Cited

U.S. PATENT DOCUMENTS

| | | | |
|---|---|---|---|
| 1,403,061 | 1/1922 | Sieurin | 423/126 |
| 2,189,376 | 2/1940 | Burman | 423/126 |
| 3,816,605 | 6/1974 | Belsky | 423/112 |
| 3,862,293 | 1/1975 | Maurel et al. | 423/126 |
| 3,959,438 | 5/1976 | Messner | 423/126 |
| 4,110,399 | 8/1978 | Gandernack et al. | 423/126 |

Primary Examiner—Herbert T. Carter
Attorney, Agent, or Firm—Darby and Darby

[57] ABSTRACT

A process for obtaining pure aluminum oxide ($Al_2O_3$) from siliceous aluminum ore is disclosed. The aluminum ore is digested in a hydrochloric acid solution to obtain aluminum chloride, the aluminum chloride is crystallized as the hexahydrate, the aluminum chloride hexahydrate is purified and, subsequently, decomposed to give pure aluminum oxide and secondary products. The mother liquor of the crystallization step and the secondary products of the decomposition step are recycled.

23 Claims, 1 Drawing Figure

METHOD FOR THE MANUFACTURE OF PURE ALUMINUM OXIDE FROM ALUMINUM ORE

This invention relates to extraction processes and, more particularly, to a method of treating aluminum ore to extract pure aluminum oxide.

Methods of treating aluminum ore to extract aluminum oxide are well known. Such processes often require the formation of aluminum chloride ($AlCl_3$) in solution, crystallization of the aluminum chloride as the hexahydrate and then decomposition of the aluminum chloride hexahydrate to obtain aluminum oxide ($Al_2O_3$). These processes differ according to the method of crystallizing the $AlCl_3.6H_2O$ and the method of separating out co-dissolved impurities.

Two basic HCL procedures are available for crystallizing the $AlCl_3.6H_2O$. Both procedures require the digestion of the aluminum ore with hydrochloric acid (HCl) and the separation of any remaining solids. In one process, the remaining solution is then evaporated past the saturation point of $AlCl_3.6H_2O$. This forces the $AlCl_3.6H_2O$ out of solution in crystalline form.

In an alternative process, the digestion solution is saturated with HCl. Gaseous HCL is passed through the solution until the solution is saturated. As a result, the $AlCl_3$ solubility is reduced and it crystallizes out of solution as the hexahydrate ($AlCl_3.6H_2O$). the HCL gas must then be driven off at a disadvantageously high energy expense. The HCL equilibria in the highly concentrated solutions are very unfavorable for absorption and require further processing steps. The absorption requires a high consumption of cooling water. Finally, the difficulties of handling highly concentrated moist HCL are well known.

The prior art teaches that use of either of these crystallization techniques requires subsequent cleaning of the product by the Bayer process or removal of iron (the main contaminant) by ion-exchange procedures and the work-up of a side stream for removing the remaining impurities. Substantial disadvantages are inherent in this treatment.

The Bayer process includes an expensive alkaline purification step. Other impurities remain in solution even when the iron (Fe) is removed as ferric chloride ($FeCl_3$) by ion-exchange procedures. A dilute $FeCl_3$ solution is formed as an eluate of the ion-exchange procedure. This solution must be purified both for ecological reasons and to recover the digestion acid, especially if the aluminum ore has a high iron content. This type of work-up requires a large energy expenditure. If the iron is extracted with solvents which are not miscible with water, similar problems arise.

Accordingly, it is an object of the present invention to provide a process for obtaining pure aluminum oxide from aluminum ore which requires the use of minimal quantities of raw materials.

It is a further object of the present invention to provide a process for obtaining pure aluminum oxide from aluminum ore in which the expenditure of energy is kept to a minimum.

It is a still further object of the present invention to provide a process for obtaining pure aluminum oxide from aluminum ore which does not contaminate the environment.

It is a still further object of the present invention to provide a process for obtaining pure aluminum oxide from aluminum ore which is as inexpensive as possible.

These and other objects of the present invention are accomplished in accordance with the invention by a process initiated by the digestion of aluminum ore with hydrochloric acid. The digestion solution contains aluminum chloride which is crystallized as the hexahydrate. The aluminum chloride hexahydrate is decomposed to obtain aluminum oxide. The crystallization solution and the secondary products of the hexahydrate decomposition are recycled to other process steps.

The present invention overcomes the inadequacies of prior art processes by novel combinations of suitable process steps in conjunction with optimized recycling of materials and energy. It has now been discovered that it is possible to optimize material usage and energy consumption simultaneously. This is accomplished by a particular cycling of materials and heat and by maintaining specified concentrations in the various solutions as described herein.

The objectives of the present invention can only be achieved with the cyclical process described herein. There is no indication in the prior art that the concentration ratios and quantities of solutions which are to be recycled would also meet the requirements for preparing an electrolytically pure aluminum oxide. This is especially true in relation to the crystallization of $AlCl_3.6H_2O$, the removal of impurities, and the maintenance and control of the various processing temperatures.

Other features and advantages of the present invention are set forth in the following detailed description which should be considered together with the accompanying drawing wherein:

FIG. 1 is a schematic flow diagram of a process in accordance with the present invention.

DETAILED DESCRIPTION OF A PREFERRED EMBODIMENT

Figure 1:
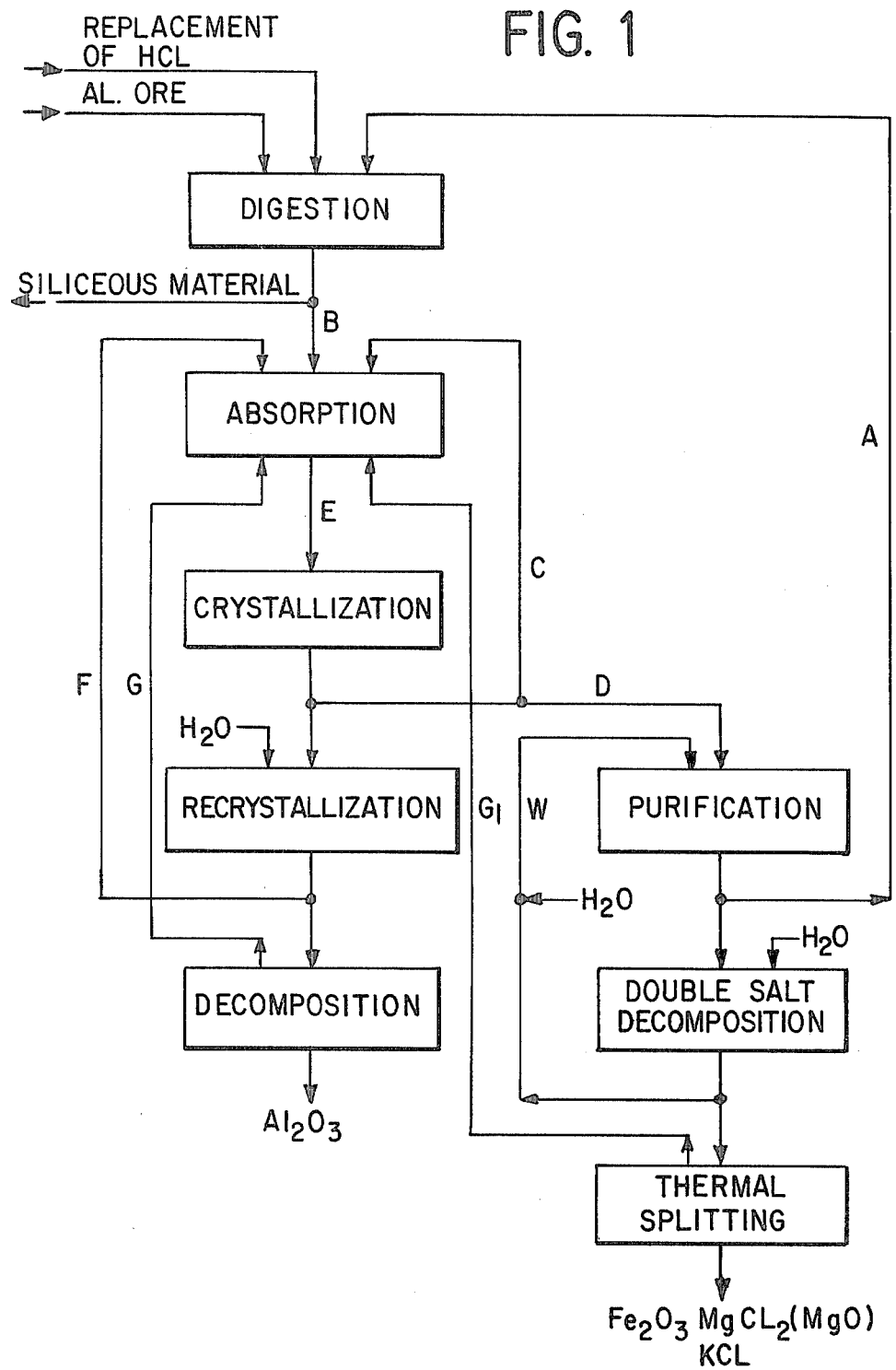

A process according to the present invention may be advantageously carried out as outlined in the schematic diagram of FIG. 1. The process described is operated in continuous fashion and each step occurs simultaneously with every other step. The steps of the process are described in the manner in which they occur once the concentrations and quantities of the various solutions have reached a steady state.

The raw material used to obtain the pure aluminum oxide may be any form or type of aluminum ore. Silicate containing aluminum ores may be used with especially good results. The raw ore may be first comminuted to reduce particle size. The particle size of the ore is not critical to the present invention, but it is often advantageous to use reduced particle sizes in the interest of increasing the surface area of the material to be processed.

The comminuted raw ore may be calcined prior to its entry into the process stream. However, calcination is optional and is often not required. Processes for calcining the ore are well known to those skilled in the art and are not described here.

The raw aluminum ore, either calcined or untreated, is digested with hydrochloric acid (HCL) to obtain aluminum chloride ($AlCl_3$) in solution and a suspension of acid insoluble impurities. The HCL solution is first adjusted to a concentration of about 15–25% acid, by weight. An optimum concentration range of 19–22% acid, by weight, is especially preferred. The acid used to adjust the solution to the concentration desired is, for the most part, recycled in counter-current fashion from later processing steps, as is described in more detail below. Some additional HCL may be added to the system at this point to replace any losses which may have occurred.

The temperature of this section of the process stream is approximately the boiling point of the acid digestion solution. This will vary depending on the particular impurities present in the aluminum ore, but will be greater than 100° C. in any case. Reaction times between about 15 mins. and 10 hours are employed and provide satisfactory results, but the optimum time required will vary depending on the particular raw material used and the fineness to which it is ground.

The reaction of the aluminum ore with the hydrochloric acid to produce aluminum chloride is strongly exothermic. This heat of reaction may advantageously be used either to heat solution A, the recycled acid coming into the digestion vessel, to the reaction temperature prior to addition of the acid to the digestion, or to recrystallize the $AlCL_3.6H_2O$ at a later stage of the process. In the former case, it is advantageous if the heat is transferred directly by as low inflow of the digestion suspension to the digestion vessel filled with the hot reaction solution. Alternatively, a portion of the digestion solution is evaporated and the vapors of this evaporation are condensed using cold digestion solution, thereby heating the cold digestion solution.

The circulating acid digestion solution contains impurities in the form of chloride salts, particularly $FeCl_3$, KCl and $MgCl_2$. Undissolved impurities, mainly amorphous $SiO_2$ and quartz, may also be suspended in the solution. The salt content of the digestion acid depends not only on the soluble impurities of aluminum present in the ore, but also on the acid content of the solution and the measures taken to remove impurities from the circulating acid solution.

At the termination of the digestion reaction, the digestion suspension is removed from the reaction vessel or vessels. After removal of the digestion suspension from the digestion vessel, the undissolved impurities may be separated from the solution. This may be done with any suitable equipment, such as thickeners, filters or hydro-cyclones (whirlpool separators) and the appropriate techniques are well known to the art.

The acid concentration in solution B, the solution remaining once the solids are removed, has decreased to between about 0 to about 15% HCl, by weight. This is due to the consumption of acid during the reaction with the $Al_2O_3$ and impurities in the crude material. The concentration of HCL in the digestion solution is increased in an absorption step using HCl gas, and solutions recycled from later processing steps. A concentration of about 14-22% weight percent free HCL must be reached before the $AlCl_3.6H_2O$ can be crystallized.

The digestion solution from which the solid materials have been removed is treated with the gases split off by the subsequent decomposition of $AlCl_3.6H_2O$ and the HCL containing gases derived from the thermal decomposition of impurities in countercurrent with the cool solutions from the subsequent crystallization steps. These gases consist of HCL, $H_2$, $N_2$, $CO_2$ and air. In so doing, the HCL present in the hot gases from the decomposition reaction, dissolves in the digestion solution. The acid content of the digestion solution is thereby increased.

The HCl absorption preferably is carried out in a two-stage absorption column. The recycled acid solutions are led in countercurrently with respect to the decomposition gases. A considerable heat of solution is released by the absorption of the hydrochloric acid. To counteract this effect the temperature of the absorption stage of the process stream is adjusted to between about 50°-120° C. by the flow of recycled cooled $AlCl_3$ saturated solutions from the later $AlCl_3.6H_2O$ crystallization and recrystallization steps. These solutions may consist of the mother liquors from the subsequent $AlCl_3.6H_2O$ crystallizations. The mother liquor from the subsequent crystallization of pure $AlCl_3.6H_2O$ is utilized completely. The maximum temperature which may be maintained is the boiling point of the solution and the temperature is preferably maintained between about 80°-90° C.

The objective at the absorption stage is to absorb a maximum amount of HCl from the raw gases present with the addition of a minimum amount of water. Temperature control is important in the absorption step in order to keep the vapor pressure of the HCl as low as possible while that of the $H_2O$ is maintained as high as possible. Thus, the condensed hot HCL gas is absorbed as completely as possible by the solution and considerable amounts of hydrochloric acid are not entrained in the inert gases. This also insures that the water vapor is removed as completely as possible with the inert gases and that larger amounts of water do not condense. The HCl which remains present in gaseous form is removed from the gaseous mixture during a purifying step. The inert gas/water vapor mixture is then eliminated from the process into the atmosphere. Alternatively, the water vapor may be condensed prior to the elimination of the gas. It is important to prevent premature precipitation of the $AlCl_3.6H_2O$ at this stage.

Solution E, the HCl enriched solution, is evaporated by expansion evaporation to crystallize the $AlCl_3$ as $AlCl_3.6H_2O$. In this step, the solubility of the $AlCl_3$ is reduced even further by utilizing the displacement of the evaporation equilibrium to higher HCL contents in the solution at lower pressures. As the acid concentration is effectively increased, the solution equilibrium is displaced and becomes less favorable for $AlCl_3$ solubility. The solution is cooled through a temperature difference of 20°-70° C. The aluminum, dissolved by the digestion of raw material then crystallizes out as the hexahydrate ($AlCl_3.6H_2O$). The final cooling temperature or crystallization temperature depends on the operating conditions.

The expansion cooling is an adiabatic process. Energy, preferably from the digestion step, is used to lower the pressure over the crystallization solution. By this means, HCl is forced out of solution and into the vapor phase. Gaseous HCl is naturally in a higher energy state than its liquid counterpart. The net effect is that the solution temperature is lowered without any net energy transfer, either into or out of the system.

The HCl containing vapors which are present at this stage of the process are condensed and the heat of condensation may be used to heat the digestion solution or to recrystallize the $AlCl_3.6H_2O$ in the recrystallization step. In the case of the recrystallization, the condensed vapors may be used together with other solutions to dissolve the crude $AlCl_3.6H_2O$ precipitate. The amount of vapors present depends on the heat content of the solution as determined by preceding process steps.

The temperature of the mother liquor of this initial crystallization is about 20°-60° C. as determined by the design of the process equipment, and more preferably, between about 30°-40° C. A portion of this solution is recycled directly, as solution C, to the absorption step, without purification. As mentioned above, this solution serves to cool the absorption solution to the required temperature. A second portion, shown as solution D, is purified before being returned to the digestion step. This purification process will be discussed in detail below.

The crude $AlCl_3.6H_2O$ obtained from the crystallization may be contaminated by adhering mother liquor. It may, therefore, be desired to purify the $AlCl_3.6H_2O$ crystals at this point. The purification of the present invention is carried out by recrystallization. It should be noted that contamination occurs to approximately the same extent in prior art procedures. In contrast to the relatively simple and inexpensive purification procedure of the present process an expensive alkaline purification or intensive washing with concentrated HCl, having all the attendant disadvantages of that procedure, have been taught and are conventionally employed in the prior art.

A recrystallization procedure is especially suitable for purifying $AlCl_3.6H_2O$. This is because there is a large quantity of water which is bound as water of crystallization and accordingly there is a clear decrease in the amount of solvent present as the crystallization progresses. Hence, only a small quantity of water must finally be evaporated. The HCL containing condensate of the crystallization of the crude salt may advantageously be utilized for dissolving the crude product, since the HCL content prevents hydrolysis of the $AlCl_3.6H_2O$ during the recrystallization.

The crude $AlCl_3.6H_2O$ of the present process is recrystallized from water and the condensed vapors from the initial crystallization. The temperature is preferably between about 80°–100° C. Steam may be blown in if it is necessary to raise the temperature. The $AlCl_3.6H_2O$ is crystallized in a known manner by evaporation of a portion of the solvent. The final temperature is adjusted to between about 20°–60° C. To obtain $AlCl_3.6H_2O$ in an even more pure form, the crude salt may be washed, for example, with the mother liquor of the crystallization of the pure salt prior to the recrystallization or the pure salt may be washed once it is obtained. Generally, this will not be necessary as the unwashed pure $AlCl_3.6H_2O$ yields electrolytically pure $Al_2O_3$ on thermal decomposition.

Solution F, the motor liquor from the recrystallization of the pure $AlCl_3.6H_2O$ is recycled to the HCl absorption step. The vapors contain only minimal amounts of HCl and may be used to dissolve the crude $AlCl_3.6H_2O$ in the recrystallization solution or for other purposes, such as washing the insoluble portions of the raw material which are separated after the digestion step.

The $AlCl_3.6H_2O$ crystals obtained from the recrystallization, or from the initial crystallization if no recrystallization is carried out, are thermally decomposed to yield electrolytically pure $Al_2O_3$, HCl and $H_2O$. The decomposition temperature may be between about 500° and 1200° C. The temperature used determines the crystalline structure of the $Al_2O_3$ and the decomposition gases in addition to the HCL and $H_2O$. The possible crystalline forms of $Al_2O_3$ include $\alpha$ or artificial corundum, $\gamma$, etc. Depending on the decomposition temperature employed, the decomposition gases which may be obtained include $N_2$, $CO_2$, CO and air.

At lower temperatures, the $AlCl_3.6H_2O$ may be indirectly heated, while at higher temperatures it may be directly heated for decomposition purposes. In the case of a multi-stage decomposition plant, there may be several streams of decomposition gases. Solution G includes all of the decomposition gases, which are recycled to the HCl absorption step to entrain the water vapor. The several streams of gases from a two-stage decomposition may be recycled either together or separately and preferably are run in countercurrently with respect to the other solutions entering the absorption.

The thermal decomposition of $AlCl_3.6H_2O$ may also be carried out up to an oxide, containing chloride. In this case, the loss of HCl must be made up appropriately so that the HCl concentrations discussed above are attained in the HCl absorption step.

The mother liquor of the initial crystallization, solution D, may be purified in a side-stream operation involving several steps, as shown in FIG. 1. The salt content of this portion of the mother liquor has been increased to such an extent that the saturation range of the double salt of $FeCl_3$ and $MgCl_2$ with KCl has been reached. It has proven to be particularly advantageous to first precipitate the Fe and Mg impurities as the double salts. This may be accomplished by admixing with KCl, preferably in the form of a concentrated solution. The required amount of KCl may be determined from the composition of the crude material, in particular, from its content of acid soluble $Fe_2O_3$ and MgO. An excess of KCl is not harmful to the process as any excess is precipitated in crystalline form as KCl.

If the KCl must be removed at the same time as and in addition to the impurities, the solution is cooled in the same processing step. The cooling is advantageously done by expansion evaporation (as has been described above in connection with the initial $AlCl_3.6H_2O$ crystallization) through a temperature difference no less than that which corresponds to the difference in solubility required for removing this amount of KCl. The necessary temperature difference is determined by an analysis of the crude material and/or of the solutions.

Since $K_2O$ MgO and $Fe_2O_3$ are almost never dissolved from the raw material in the ratios corresponding to the stoichiometry of the double chlorides, it is necessary to add the missing KCl componenet. The precipitation of double chlorides with the $AlCl_3.6H_2O$ is avoided because the mother liquor of the $AlCl_3.6H_2O$ crystallization contains the components of the salts on the one hand in ratios not suitable for precipitation, and on the other, in too diluted a state.

It is necessary to regulate the conditions for precipitating the double salts so that the solubility limit for $AlCl_3$ is not exceeded. Some $AlCl_3$ remains present in the mother liquor of the $AlCl_3.6H_2O$ crystallization and it is not desired to precipitate out this material as an impurity. At the same time, the HCL concentration must be kept sufficiently high so that the double salts have a low solubility. In this fashion, pure $Al_2O_3$ may be obtained without repeated recrystallization. A suitable concentration range has been found to be between about 15% and about 25% HCl, by weight.

The acid-insoluble double salts may advantageously be separate from the solution. After replacing any water and HCl lost in removing the acid insoluble components, the mother liquor from the potassium, iron, and magnesium chlorides crystallization is recycled to the digestion stage, as solution A.

Besides making up losses in this step, it may be advantageous to make up water losses also during the recrystallization of $AlCl_3.6H_2O$ and to make up acid losses by the addition of hydrogen chlorides or concentrated hydrochloric acid before or after the $AlCl_3.6H_2O$ crystallization. The HCl to be replaced may be used in either gaseous or liquid form. The temperature of these additional components is not critical.

In this manner, the KCl or $FeCl_3$, required for the precipitation can readily be recycled to the crystallization of $2KCl.FeCl_3.H_2O$ and carnallite from the mother liquor of the crystallization of crude $AlCl_3.6H_2O$.

A further benefit of the present process is the advantageous separation of the seperate potassium, iron and magnesium chlorides. The salts are precipitated as $2KCl.FeCl_3.H_2O$ and $KCl.MgCl_2.6H_2O$. These salts can be dissociated by water into KCl and an $FeCl_3/MgCl_2$ solution. This decomposition is possible because once the HCl solution is separated for recycling, the solubility range of the salts is displaced. The bulk of the KCl remains undissolved when all of the $FeCl_3$ and $MgCl_2$ have been dissolved and may be removed by filtering or centrifuging. Depending on the composition of the raw materials, either the KCl or the $FeC_3/MgCl_2$ solution may be recycled to the purification step as "solution" W.

In most cases, the KCl component is recycled and the complex potassium, iron and magnesium chlorides are worked up suitably by the following procedure. The precipitated salts may be treated with an amount of water, sufficient for dissolving all of the $FeCl_3$ and $MgCl_2$. The bulk of the KCl remains behind undissolved and is removed by filtering or centrifuging. Referring to FIG. 1, water may be added to the recycled "solution" W in order to obtain a concentrated KCl solution for use in the purification. The resulting $FeCl_3$ and $MgCl_2$ solution may be discarded, or preferably evaporated and thermally decomposed to yield $Fe_2O_3$, MgO, $H_2O$ and HCl. Depending on operating conditions, only the $FeCl_3$ may be decomposed and the $MgCl_2$ alternatively maintained as the chloride. The HCl recovered by this procedure may be recycled to the absorption step as solution $G_1$.

A process carried out in accordance with the present invention is described in the following illustrative example.

EXAMPLE I 1,000 kg of pure $Al_2O_3$ was prepared by the following method: crude aluminum ore was pretreated by heating to 700° C. using known techniques and apparatus. The analysis of the calcined material used was:
$Al_2O_3$: 30% by weight
$SiO_2$: 61% by weight
$Fe_2O_3$: 3% by weight
$K_2O$: 2% by weight
MgO: 1% by weight
CaO: 1% by weight
Other impurities (including F, $TiO_2$) 2% by weight 3,930 Kg of the calcined ore was comminuted and treated with 17,000 kg of 21% HCl by weight (3,570 kg free HCl) at the boiling temperature of 110° C. Technical HCl was used at the start of the process, but as the process continued the HCl was prepared from the highly acidic solution A obtained from purification of the mother liquor of the $ACl_3.6H_20$ crystallization. This solution contained dissolved salts of $AlCl_3$, $FeCl_3$, KCl, $MgCl_2$ and other impurities. Only losses of HCl and water which had occurred were made up at this stage. The $Al_2O_3$ present in the crude aluminum ore went into solution to form $AlCl_3$ with a substantial evolution of heat.

The siliceous components, comprising mainly $SiO_2$ but also traces of $TiO_2$ and $CaF_2$ in excess of the solubility limit, were separated at 100° C. These materials were washed countercurrently with water in several stages at temperatures between 60° and 90° C. The wash solutions were combined with the crude aluminum chloride solution, (solution B), to make up a water loss of 3,150 kg. The HCl losses amounted to 90 kg and were made up with acid solutions recycled from later process steps. 22,000 kg of clarified, crude aluminum chloride solution were obtained.

The concentration of HCl was increased in a multi-stage absorption apparatus. The crude aluminum chloride solution flowed countercurrently with HCl and $H_2O$ containing gases obtained from the thermal decomposition of the $AlCl_3.6H_2 O$ (as described below) and from the thermal splitting of the double salts from the purification of the mother liquor of crystallization.

The temperature of the absorption step was maintained at 80°–90° C. A portion of the cooled mother liquor from the $AlCl_3.6H_2O$ crystallization, having a temperature of 50° C., was recycled into the lower stages of the absorption apparatus adjoining the inlet for the HCl-containing gases. This was carried out in such a way that the lower temperatures advantageous for the absorption of HCl were fully utilized, while the temperatures were maintained sufficiently high to prevent condensation of the water vapor simultaneously contained in the gases to the greatest extent possible. To maintain a temperature of 90° C. in the absorption, 74,000 kg of mother liquor at 50° C. was recycled to the absorption plant. The hot entering solution, soluton B, was conducted to the first stage of the absorption with very minimal cooling. As a result of the low HCl concentration, only significant amounts of HCl remained in the residual gases while water vapor was entrained up to the saturation limit and carried out with the gases.

105,000 kg of $AlCl_3$ solution having a temperature of 90° C. and HCl concentration of 18.7% by weight flowed out of the absorption apparatus to the expansion crystallization. The solution was cooled using a portion of the heat brought along from the digestion and taken up in the absorption for evaporating the solvent by reducing the pressure. The final temperature achieved was 50° C.

The final concentration of HCl in solution was 21% by weight when equilibrium was achieved at 50° C. between the solution and the mixture of gaseous HCl and water vapor above it. A decrease in the $AlCl_3$ concentration due to the increased HCl concentration was apparent. The chlorides of the impurities present also exerted an influence on the solubility of $AlCl_3$. A total of 5,800 kg of $AlCl_3.6H_2O$ crystallized out of solution.

The $AlCl_3.6H_2O$ was then recrystallized from the condensed vapors of the initial crystallization and live steam. The steam was added by injection. The amount of liquid and steam was adjusted to obtain a solution saturated with respect to aluminum chloride at temperatures between about 80° to 110° C. The solution contained approximately 10 to 30 g/l of free HCl.

Thermal decomposition to yield 1,000 kg of electrolytically pure $Al_2O_3$ and decomposition gases, which were recycled to the absorption step at a temperature of 110°–120° C., was carried out at temperatures of 1000° to 1200° C. The aluminum oxide obtained was a mixture of gamma and alpha modifications. The chemical purity of the product was superior to that of Bayer process alumina which is presently used in aluminum metal production.

The mother liquor of the crystallization totalled 91,500 kg. and was divided into two portions. 74,000 kg were recycled to the absorption step, as described above. The remaining 17,500 kg were purified according to the following process:

The 17,500 kg of mother liquor introduced into the purification process at 50° C. were cooled by expansion evaporation to 25° C. The condensation of HCl in the vapors shifted accordingly to achieve equilibrium with the solution.

At the same time, a concentrated KCl solution prepared from 205 kg of KCl and 320 kg of water was introduced. The double salts of potassium chloride with iron (III) chloride ($2KCl \cdot FeCl_3 \cdot H_2O$) and magnesium chloride ($KCl \cdot MgCl_2 \cdot 6H_2O$, although the amount of crystalline water actually varied) crystallized out and were separated off using conventional techniques. 16,800 kg of mother liquor remained and were recycled to the digestion step. The double salts present were decomposed with water. The double salt solution contained 33% iron chloride ($FeCl_3$) and 10% magnesium chloride ($MgCl_2$), by weight. The bulk of the KCl precipitated in solid form and was recycled into the process for precipitating the double salt.

The iron and magnesium chloride solutions obtained were thermally decomposed to recover the HCl contained in the salts. The HCl obtained was recycled to the absorption.

As is evident from the above description, the most important advantages of the process described herein are seen to lie in the recycling of all working materials, a logical recovery of the heat liberated in the treatment of raw material with acid, as well as of the heat supplied for the thermal decomposition of $AlCl_3 \cdot 6H_2O$ and in the exceptionally advantageous removal of the impurities $Fe_2O_3$, $K_2O$ and MgO contained in the ores. In this connection, it is important to control the temperature and the HCl content of the solutions during the process within the stated limits, since it is only possible by such means to adhere to the material flows and salt concentrations necessary for the various process steps. Moreover, there is no phase in which the solutions of crude materials, which are exceedingly corrosive because of their content of strong HCl and of impurities, particularly $FeCl_3$, come into direct contact with heat-exchanger surfaces. Consequently, corrosion as well as erosion of this apparatus is largely avoided.

What is claimed is:

1. A process for obtaining pure aluminum oxide from siliceous aluminum containing ore, which comprises:
   introducing said aluminum containing ore to a starting solution;
   adjusting the HCL concentration of said starting solution to between 15-25% acid by weight;
   continuously digesting the aluminum containing ore in said starting solution to form a digestion solution containing aluminum chloride and a suspension of acid insoluble solid materials;
   separating said insoluble solid materials from said suspension to form a cleared aluminum chloride solution;
   increasing the hydrochloric acid concentration in said cleared aluminum chloride solution to between 14-22% free HCL by weight by absorption of HCL gases evolved and recycled from said subsequent decomposing operation to thereby form an absorption solution;
   evaporating said absorption solution by expansion evaporation to crystallize the aluminum chloride from said absorption solution as crude aluminum chloride hexahydrate crystals and simultaneously evolving HCL containing vapors;
   condensing said HCL containing vapors and recycling said vapors of said heat of condensation for use in said process;
   recycling a portion of the mother liquor from said crystallization into said absorption solution to cool said absorption solution;
   decomposing the aluminum chloride hexahydrate to obtain aluminun oxide and decomposition gases; and
   recycling the decomposition gases to the absorption solution.

2. A process as defined in claim 1 which comprises dissolving the crude aluminum hexahydrate crystals in water and the recycled condensed HCL containing vapors of the crystallization step to form a recrystallization solution, subjecting said recrystallization solution to expansion evaporation to recrystallize pure aluminum chloride hexahydrate crystals therefrom.

3. The process of claim 2 wherein said crystallization mother liquir has a temperature between about 20° and 60° C. and is recycled directly to said absorption solution.

4. A process as defined in claim 1 which comprises adjusting the temperature of said absorption solution to between about 50° and about 120° C. by recycling a portion of the mother liquor from said crude crystallization and the mother liquor from said recrystallization to said absorption solution.

5. A process as defined in claim 1 which comprises
   purifying the remaining portion of said crystallization solution mother liquor to remove impurities therefrom; and
   recycling the purified portion of said crystallization solution to said digestion solution.

6. A process as defined in claim 5 wherein said purifying step comprises adding a sufficient quantity of potassium chloride to said remaining portion of said crystallization solution mother liquor to precipitate the iron and magnesium impurities therein as double salts separating said precipitated iron and magnesium impurities from said crystallization solution portion and recycling said double salt free crystallization solution to said digestion solution.

7. The process as defined in claim 6 further comprising simultaneously cooling said crystallization solution mother liquor to precipitate potassium chloride therefrom.

8. The process as defined in claim 6 which comprises dissolving the precipitated iron and magnesium chloride impurities in water to form a purification solution containing undissolved potassium chloride;
   removing said potassium chloride from said purification solution by filtering or centrifuging;
   evaporating said solution to yield particulate materials; and
   thermally decomposing said particulate materials to yield $FE_2O_3$, MgO, $H_2O$ and HCL; and
   recycling the HCL directly to the absorption step.

9. A process as defined in claim 6 which comprises decomposing the double salts isolated from said crystallization solution with water, separating the undissolved potassium chloride from said double salt solution and recycling said potassium chloride to the purification step.

10. A process as defined in claim 9 which comprises evaporating the solution containing the double salts and thermally splitting said double salts to release hydrochloric acid which is recycled to the absorption solution.

11. A process as defined in claim 1, which comprises decomposing said aluminum chloride hexahydrate in the temperature range between about 500° C. and about 1200° C.

12. The process of claim 1 wherein the temperature of the portion of mother liquor of the initial crystallization recycled to said absorption solution is between about 20% and 60%.

13. A continuous process for obtaining pure aluminum oxide from aluminum containing ore which comprises:
   introducing said ore to a solution containing hydrochloric acid;
   adjusting the concentration of said hydrochloric acid solution to between about 15-25% acid by weight to form a digestion solution,
   continuously digesting the aluminum containing ore in said digestion solution to form a solution containing aluminum chloride and a suspension consisting of acid insoluble solid materials,
   separating the acid insoluble solid materials from said digestion solution to form an absorption solution,
   increasing the concentration of hydrochloric acid in said absorption solution to between 14-22% by weight of free hydrochloric acid by absorption of HCL gases recycled to said absorption step from said subsequently occurring thermal decomposition step,
   subjecting said absorption solution to expansion evaporation to crystallize the aluminum in said solution in the form of aluminum hexahydrate crystals,
   separating said aluminum chloride hexahydrate crystals and the mother liquor of said crystals from one another,
   recycling a portion of the mother liquor directly into the absorption step and introducing the residual portion of the mother liquor into a purification stream for the removal of iron, magnesium and potassium contaminants,
   heating said aluminum chloride hexahydrate crystals to form aluminum oxide and decomposition gases,
   recycling the decomposition gases to the HCL absorption step to entrain the water vapor and recovering said pure aluminum oxide.

14. A process as defined in claim 13, which comprises purifying the residual portion of said crystallization solution mother liquor by adding potassium chloride to said mother liquor to precipitate the double salts of Fe and Mg and recycling the mother liquor of the double salt precipitation to the digestion solution.

15. A process as defined in claim 14 which comprises comminuting said aluminum containing ore prior to said digesting operation.

16. A process as defined in claim 15 which comprises:
   adjusting the temperature of said absorption solution to between 50° and 120° C. by introducing said recycled mother liquor solution to the section of the process stream in which the HCL concentration of said absorption solution is to be increased.

17. A process as defined in claim 16 wherein said expansion evaporation comprises reducing the temperature of said absorption solution between from about 20° to about 70° C. and thereby reducing the solubility of $AlCl_3$ in said absorption solution.

18. A process as defined in claim 16 which comprises thermally decomposing said aluminum chloride hexahydrate at a temperature of between about 500°–1200° C. to form aluminum oxide of the formula $Al_2O_3$, HCL and water.

19. A process as defined in claim 16 which comprises: recrystallizing said aluminum chloride hexahydrate in the warm condensate isolated from said crystallization evaporation step.

20. A process as defined in claim 18 wherein said decomposition gases include $N_2$, $CO_2$, CO and air.

21. A process as defined in claim 15 which comprises adjusting the HCL concentration of said starting solution to between about 19 and 22% HCL by weight.

22. A process as defined in claim 15 which further comprises calcining said aluminum containing ore prior to said digesting operation.

23. The process as defined in claim 14 which comprises dissolving the crude aluminum chloride hexahydrate crystals in water and the condensed vapors recovered from the evaporation of said crystallization solution to thereby form a recrystallization solution; and
   subjecting said recrystallization solution to expansion evaporation.

* * * * *